March 16, 1943.    L. GRUDIN    2,314,272
APPARATUS FOR PHOTOGRAPHICALLY REPRODUCING
DISPLAY TYPE LINES AND THE LIKE
Filed Jan. 24, 1941    4 Sheets-Sheet 1

INVENTOR.
Louis Grudin
C. P. Goepel
BY
his ATTORNEY

March 16, 1943.                L. GRUDIN                2,314,272
           APPARATUS FOR PHOTOGRAPHICALLY REPRODUCING
                DISPLAY TYPE LINES AND THE LIKE
                      Filed Jan. 24, 1941              4 Sheets-Sheet 3

INVENTOR.
Louis Grudin
C. P. Goepel
his ATTORNEY

Patented Mar. 16, 1943

2,314,272

UNITED STATES PATENT OFFICE 2,314,272

APPARATUS FOR PHOTOGRAPHICALLY REPRODUCING DISPLAY TYPE LINES AND THE LIKE

Louis Grudin, New York, N. Y.

Application January 24, 1941, Serial No. 375,827

15 Claims. (Cl. 95—4.5)

This invention relates to new and useful improvements in apparatus for photographically reproducing display type lines and the like and more particularly to a mirror construction for reflecting the line of type from a composing board to the camera, having for its object to provide a flexible mirror which is adjustable to vary the character, size, shape and style of the letters of the type line reflected to the camera.

Another object of my invention is to distort the line of type or the like equally along its entire length so that all the letters or characters are altered equally in any one direction, whether vertically, horizontally or diagonally, to any selected degree of slope or stretch or contraction, without entailing undesired irregularities or effects such as spherical aberration, perspective foreshortening or blurring.

The invention consists in a flexible mirror supported in a frame which maintains the center of the mirror fixed but which is capable of moving the edges of the mirror to vary the latter from a plano surface to a concave and also to a convex surface, to create alterations and variations of the reflected type line to the camera.

The invention also consists in a mirror supported on an adjustable frame which may be rotated in one direction or the other about a fixed central axis corresponding to the center of the mirror.

The invention consists further in a supporting structure for a flexible mirror which maintains the center point of the mirror fixed but which is selectively adjustable to alter the curvature of the mirror for providing a variable parabolic reflecting surface.

The invention consists moreover, in a flexible mirror wherein the central point thereof is fixed but with the lateral sides of the mirror adjustable to change the reflecting surface of the mirror from plano to concave, convex, and parbolic, to obtain altered and differently proportioned reproductions of the same original type line.

Finally, the invention consists in a flexible, rotatable mirror in which the motion of curvature and the motion of rotation have a single fixed common center, and in which the reflected mirror image remains in focus throughout a wide range of mirror curvatures, concave or convex.

Other new and novel features of the invention will be hereinafter set forth in the following description, illustrated by way of example in the accompanying drawings and more particularly pointed out in the appended claims. Referring to the drawings in which numerals of like character designate similar parts throughout the several views:

Figure 1:
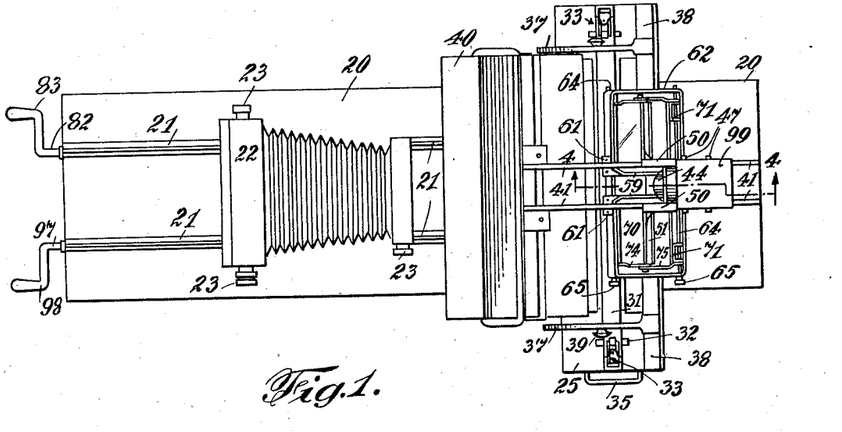
Fig. 1 is a top plan view of the apparatus for photographically reproducing type lines from a copy board and including the mechanism for adjustably supporting the mirror.
Figure 2:
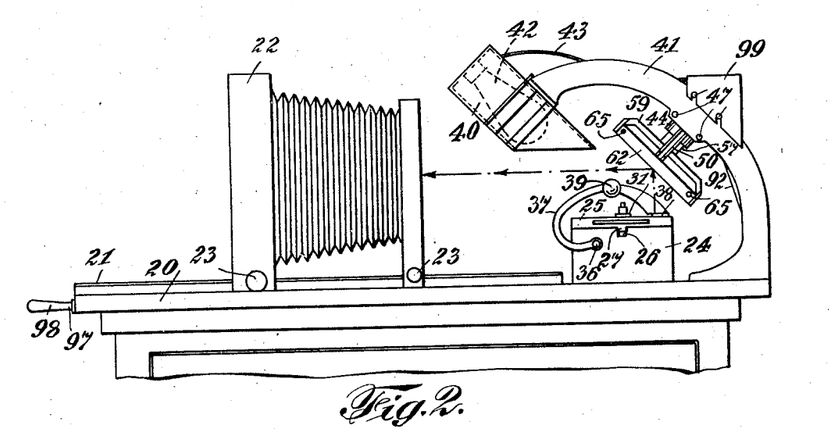
Fig. 2 is a fragmentary view in side elevation of the apparatus shown in Fig. 1.

In the drawings, referring first to Figs. 1 and 2, numeral 20 represents a flat base member having thereon a pair of spaced racks 21 extending longitudinally from one end of the base and supporting a camera 22 which may be adjusted longitudinally along the racks 21 by means of the usual rollers mounted on transverse shafts and provided with adjusting knobs 23. The racks 21 terminate adjacent a transverse block 24 which forms a raised platform on the base member 20 for supporting a removable composing board 25. In order to insure proper alignment of the composing board on the block, the latter is provided centrally thereof with a longitudinal recess 26 adapted to receive the longitudinal rib 27 on the underside of the composing board as shown in Fig. 2.

Figure 3:
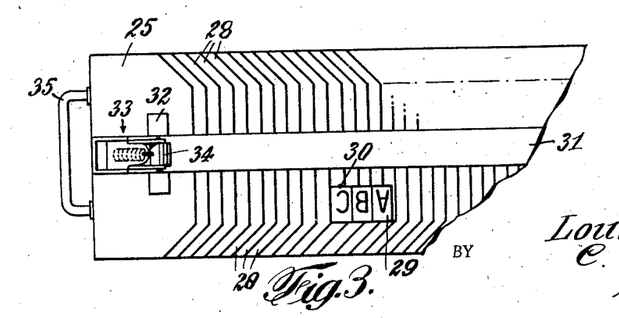
Fig. 3 is a fragmentary detail top plan view of the copy board from which the type line is reproduced.

The composing board 25 preferably carries on its upper surface a plurality of transverse flap members 28 arranged in overlapped relation to provide a series of pockets each adapted to receive the individual letters 29 used in composing a type line. Each of these individual letters is printed on sheets having a register line 30 to facilitate alignment of the letters with one another in the flaps 28. A removable bar 31 is adapted to extend longitudinally across the central portion of the composing board 25 for holding the flaps 28 in flattened condition to prevent displacement of the letters 29, said bar terminating at its opposite extremities in a leaf spring 32 as shown in Fig. 3. Each end of the bar 31 is adapted to be engaged by a spring clamp device 33 provided with a roller 34. To facilitate handling, the composing board 25 is provided with a handle 35.

A shaft 36 extends longitudinally through the block 24 adjacent one edge of the latter and pivotally supports at its opposite extremities a pair of curved arms 37 connected at their free ends to a longitudinal plate 38 adapted to overlie the composing board 25 and rest on one edge of the letters 29 to flatten the latter. One of the arms 37 is provided with a knob 39 intermediate its ends for swinging the arms on their pivot to raise and lower the plate 38. While I have shown and described the composing board 25 as having a series of flaps, it is to be understood that I do not intend to limit myself in this particular as the invention is equally applicable to any form of copy board as will be apparent from the following description.

Angularly disposed above the base 20 between the camera 22 and the block 24 is a transverse light box 40 supported on the upper ends of a pair of curved brackets 41 mounted on the rear extremity of the base 20. The light box 40 houses a battery of light bulbs or the like 42 connected to a suitable source of electric current by means of wire 43. The light rays from the bulbs 42 project downwardly through the open bottom of the box 40 onto the composing board 25.

Figures 4, 5:
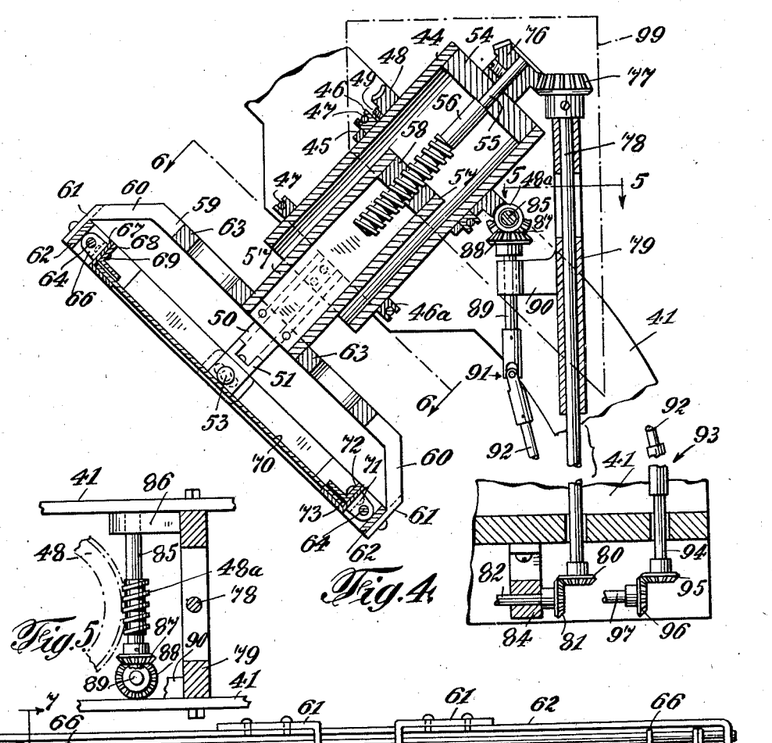
Fig. 4 is a sectional view taken on line 4—4 of Fig. 1.
Fig. 5 is a sectional view taken on line 5—5 of Fig. 4.

Referring to Fig. 4, the brackets 41 rotatably support therebetween a tubular member 44 projecting downwardly toward the composing board 25 at an angle of 45°. The member 44 is provided with an annular stop shoulder 45 adjacent its upper end engaging the lower edge of a split collar 46 secured in place between the brackets 41 intermediate the ends of the latter by means of transverse bolts 47. A worm wheel 48, keyed by means of threaded pin 49 to the tubular member 44, engages the upper edge of the split collar 46 for rotating the tubular member 44 about a central axis. A second split collar 46a also bolted to the brackets 41 embraces the lower portion of tubular member 44 and forms a bearing to additionally support said member.

A pair of channel bars 50 bolted or otherwise suitably secured at one end to opposite sides of the lower portion of the tubular member 44 extend downwardly from the latter and are connected to a horizontal channel bar 51. Adjacent its opposite longitudinal extremities, the channel bar 51 has secured to its underside a pair of channel irons 52, each supporting a short longitudinal shaft 53 forming a fixed center axis for a mirror as will later appear.

Figure 6:
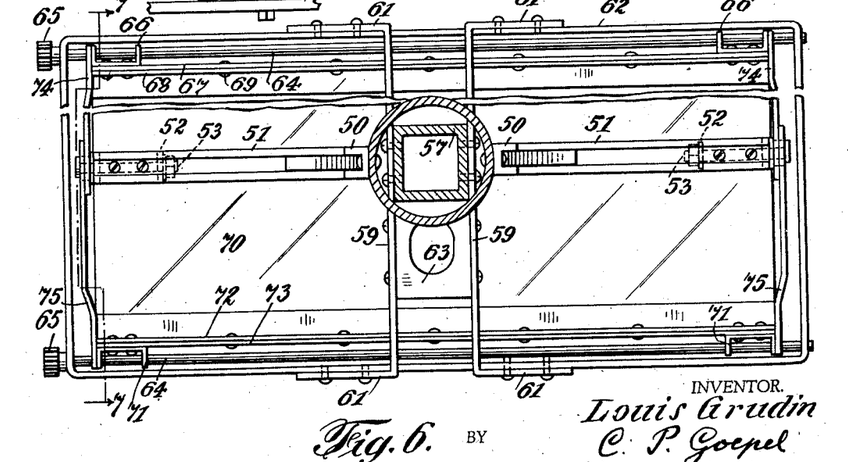
Fig. 6 is another sectional view on line 6—6 of Fig. 4.

The upper end of the tubular member 44 is closed by a circular plate 54 provided with a central opening to receive the reduced upper end 55 of a threaded shaft 56 which extends downwardly into member 44 and into a hollow square member 57 disposed within member 44 and adapted to move longitudinally therein. A threaded nut 58 fixed to the upper end of the square member 57 cooperates with the threads on the threaded shaft 56 to move said square member longitudinally upon rotation of the shaft 56 hereinafter more fully described. The lower end of the square member 57 has bolted to opposite sides thereof a pair of arms 59 overlying the channel bar 51 and extending transversely across the latter as best seen in Fig. 6. The arms 59 have downwardly bent portions 60 adjacent their opposite longitudinal extremities which terminate in outwardly extending flanges 61 bolted to the opposite longitudinal sides of a rectangular frame 62. Intermediate the square member 57 and the downwardly bent portions 60, the arms 59 are reinforced by a stiffening plate 63 disposed between the arms and bolted thereto.

Each of the transverse sides of the frame 62 adjacent its opposite extremities is provided with a drilled opening to receive one of a pair of shafts 64 which extend longitudinally in parallel spaced relation with one another in the frame and with the longitudinal sides of the latter. One of the projecting ends of each of the shafts 64 preferably terminates in a knob 65 to facilitate insertion and removal of the shafts. One of the shafts 64 rotatably supports a longitudinally spaced pair of channel irons 66 bolted to the vertical flanges of a pair of angle bars 67 and 68 arranged in juxtaposition and secured together by rivets or bolts 69. The lower horizontal flanges of the angle bars 67 and 68 both extend inwardly toward the channel bars 51 and are spaced from one another vertically to form a longitudinal slot for the reception of the corresponding longitudinal edge of a flexible mirror 70. The other shaft 64 rotatably supports a longitudinally spaced pair of channel irons 71 oppositely disposed to the channel irons 66 and bolted to the vertical flanges of a second pair of angle bars 72 and 73 also arranged in juxtaposition and bolted together but disposed oppositely to the angle bars 67 and 68 so that the lower horizontal flanges thereof both extend inwardly toward the channel bar 51 and support the opposite longitudinal edge of the mirror 70.

In order to maintain the center axis of the mirror 70 fixed with respect to the copy board 25, the outer edges of angle iron 66 are rigidly connected to one end of a pair of transverse arms 74 rotatably supported on one of the shafts 64. The opposite ends of arm 74 terminate in elongated slots which slidably embrace the projecting ends of the corresponding shaft 53 supported on the opposite extremities of the channel bar 51. A second pair of transverse arms 75 rotatably supported at one end on the other shaft 64 and rigidly secured to corresponding angle irons 71, also terminate in elongated slots at their opposite ends slidably embracing the shafts 53 in overlapping relation to the arms 74. Preferably, the transverse arms 74 and 75 are bent outwardly, or may be spaced from the transverse edges of the mirror to permit freedom of movement of said arms and mirror.

It will thus be seen that the longitudinal edges of the mirror are supported within the rectangular frame 62 which is movable toward and away from the copy board 25 but that the channel bar 51 which carries the shafts 53 is fixed with respect to the frame 62 so that the longitudinal center axis of the mirror will remain fixed with respect to the copy board 25. Due to this fixed longitudinal center axis, movement of the frame 62 toward and away from the copy board 25 will cause arms 74 and 75 to rock angle irons 67, 68 and 72, 73 on their pivots 64 in opposite directions to alter the mirror from a plano to concave or convex reflecting surfaces, dependent upon the position of the square hollow member 57 in the tubular member 44. The channel bar 51 maintains the longitudinal center axis of the mirror 70 at a predetermined fixed distance from the copy board 25 such that the type line is in the vicinity of the principal focus of the mirror when the latter is adjusted to its maximum concave curvature.

Figure 7:
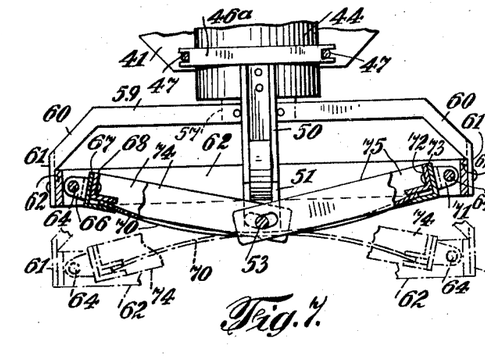
Fig. 7 is a sectional view taken on line 7—7 of Fig. 6.

The upper reduced end 55 of the threaded shaft 56 carries a bevel gear 76 keyed thereto and meshing with a complementary bevel gear 77 carried on the free end of vertical shaft 78 mounted in a suitable support 79 carried by the brackets 41. The lower end of shaft 78 projects through a suitable opening in the bottom of the base 20 and carries another bevel gear 80 meshing with a complementary bevel gear 81 fixed to one end of a shaft 82 extending longitudinally from the rear portion of the base 20 to the front thereof where it terminates in a handle 83. The shaft 82 is rotatably supported on the underside of the base 20 in any suitable brackets 84, one of which is shown in Fig. 4. Thus, upon turning the handle 83 in one direction or the other, the threaded shaft 56 will be rotated and will cooperate with the threaded nut 58 to move the square member 57 longitudinally in the tubular member 44 to correspondingly raise or lower the frame 62, thereby moving the longitudinal edges of the mirror 70 with respect to the fixed longitudinal center axis of the mirror to alter the mirror from plano to convex or to concave as clearly shown in Fig. 7.

In operation, the type line or other image on the copy board 25 to be reproduced is placed on the transverse block 24 so that it will be reflected from the mirror 70 to the camera 22. The camera is then focused for any size desired while the reflecting surface of the mirror 70 is plano and once properly focused for a given size of image, the camera will always be in focus for any degree of mirror curvature. This is due to the fact that the center line of the image on the copy board 25 is at a fixed distance from the longitudinal center axis of the mirror which center axis remains fixed while only the longitudinal edges of the mirror are movable toward and away from the copy board to provide different mirror curvatures, both concave and convex.

Figures 8, 8A:
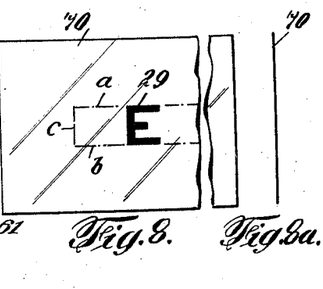
Fig. 8 is a fragmentary detail front elevation of the mirror, showing the reflected type line from the copy board with the mirror adjusted to provide a plano surface.
Fig. 8a is an end view of the mirror shown in Fig. 8.
Figures 9, 9A, 10, 10A, 11, 13:
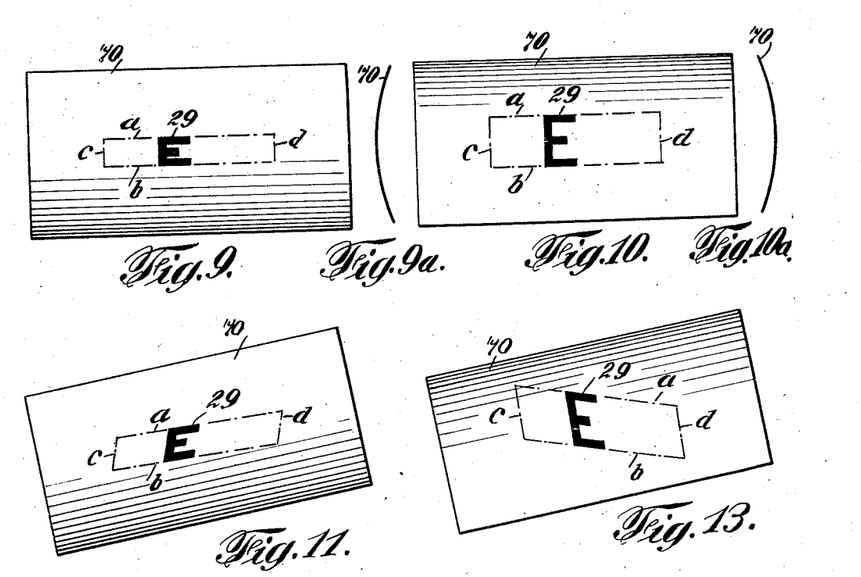
Fig. 9 is a detail front elevation of the mirror, showing the reflected type line from the copy board with the mirror adjusted to provide a convex surface.
Fig. 9a is an end view of the mirror shown in Fig. 9.
Fig. 10 is a detail front elevation of the mirror, showing the reflected type line from the copy board when the mirror is adjusted to provide a concave surface.
Fig. 10a is an end view of the mirror shown in Fig. 10.
Fig. 11 is a view similar to Fig. 9 but showing the mirror rotated to one side of the longitudinal center line.
Fig. 13 is a view similar to Fig. 10 but showing the mirror rotated to one side of the longitudinal center line.

With the mirror adjusted to a plano reflecting surface, the image on the mirror will be a true reflection of the type line on the copy board 25 as shown in Fig. 8. When adjusted to form a convex reflecting surface by turning handle 83 in one direction, the image on the mirror 70 will appear reduced vertically as shown in Fig. 9. On the other hand, with the mirror adjusted to form a concave reflecting surface by turning handle 83 in the opposite direction, the image reflected from the copy board will appear elongated vertically as shown in Fig. 10.

The supporting structure for the mirror 70 is also rotatable about a central axis by means of the worm wheel 48 on the tubular member 44, meshing with a transverse worm shaft 85 supported at one end in a bearing 86 mounted on one of the brackets 41 (Fig. 5). The opposite end of the worm shaft 85 has fixed thereto a bevel gear 87 meshing with a complementary bevel gear 88 carried on the upper end of a short vertical shaft 89 rotatably supported in a bearing-forming bracket 90 mounted on the other bracket arm 41 in opposite relation to the bearing 86. The lower end of the shaft 89 is connected by means of a universal joint 91 to one end of a downwardly inclined connecting rod 92 which terminates at its lower extremity in a universal joint connection 93 with the upper end of a short vertical shaft 94 extending through a suitable opening in the base 20 adjacent the shaft 78 and spaced rearwardly from the latter. The lower end of the shaft 94 has fixed thereto a bevel gear 95 meshing with a complementary bevel gear 96 secured to one end of a shaft 97 which also extends longitudinally from the rear portion of the base 20 to the front thereof, terminating in a handle 98 spaced from the handle 83.

The upper portion of the tubular member 44 together with the bevel gear 76, 77 and the worm drive 48, 85, just described, are all preferably enclosed in a removable cover 99 shown in dotted lines in Fig. 4 and in full lines in Figs. 1 and 2.

Figure 12:
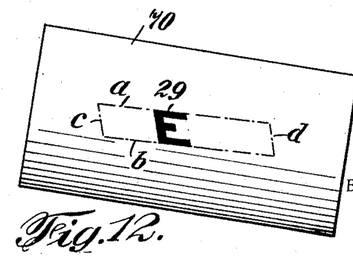
Fig. 12 is a similar view showing the mirror rotated to the opposite side of the longitudinal center line.
Figure 14:
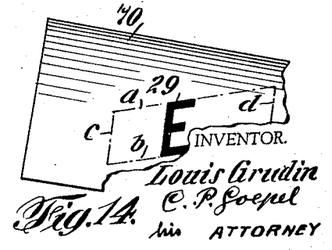
Fig. 14 is a similar view showing the mirror rotated to the opposite side of the longitudinal center line.

Referring to Fig. 11, the mirror 70 is shown adjusted to provide a convex surface when the handle 83 has been turned in the proper direction. The mirror is also shown as having been rotated on its central axis by turning handle 98 in one direction so that the reflected image is not only reduced vertically but slanted in one direction. Fig. 13 shows the mirror 70 also rotatably moved to a similar position on its central axis but with the mirror adjusted to provide a concave reflecting surface so that the reflected image is vertically elongated and slants in the opposite direction from Fig. 11. Movement of the handle 98 in the opposite direction to rotate the mirror 70 in a direction opposite to that shown in Figs. 11 and 13 with the mirror adjusted to form a convex reflecting surface and a concave reflecting surface, respectively, causes the reflected images to be slanted in directions opposite from those shown in Figs. 11 and 13 as clearly illustrated in Figs. 12 and 14, respectively.

As clearly shown in Figs. 8 to 14, regardless of the adjustments of the mirror to provide different effects, the reflected image is always correspondingly stretched or squeezed equally throughout the entire length of the type line. In other words, the image is contained in an imaginary parallelogram having top and bottom parallel lines a and b and end parallel lines c and d.

Figures 15, 16, 17, 18:
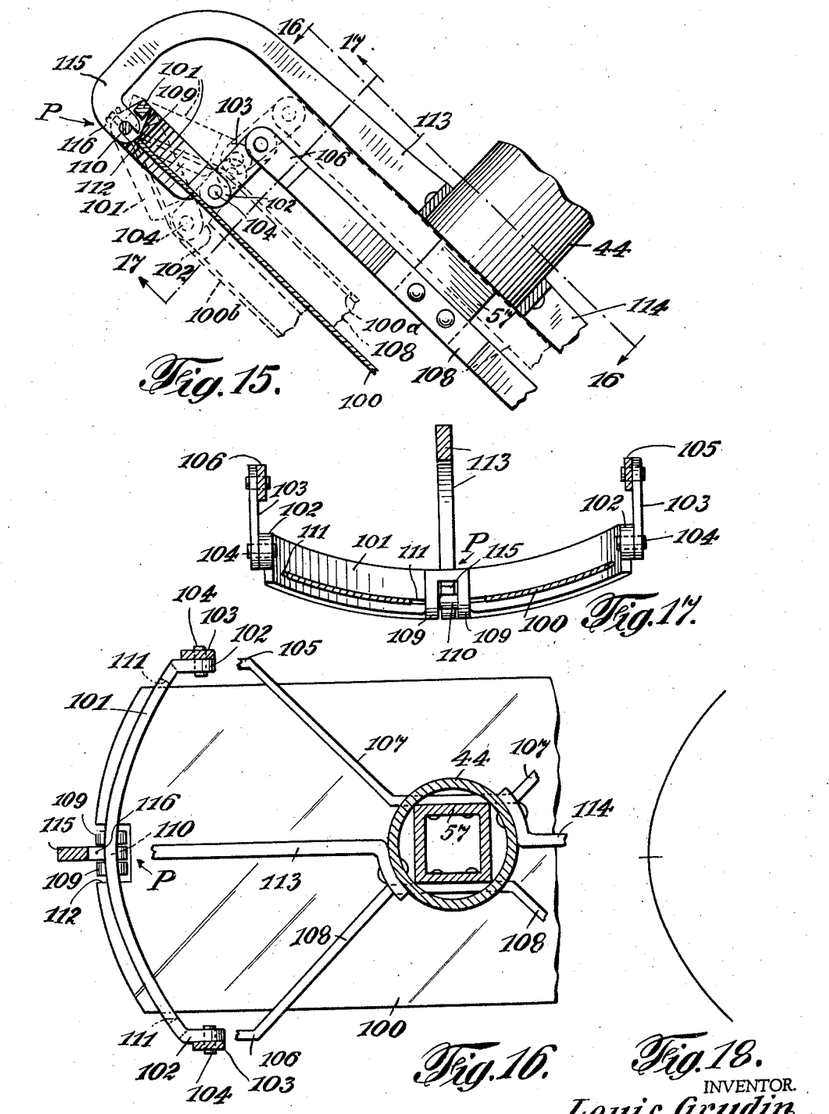
Fig. 15 is a fragmentary longitudinal section through the mirror and adjustable supporting structure for correcting distortion and spherical aberration for the higher curvatures of the mirror.
Fig. 16 is a sectional view taken on line 16—16 of Fig. 15.
Fig. 17 is a similar view taken on line 17—17 of Fig. 15.
Fig. 18 is a detail end view of a parabolic mirror.

In the foregoing description of my invention the mirror 70 is adjustable from a plano surface to uniform curved surfaces either concave or convex. In Figs. 15 to 17, inclusive, I have shown a modified form of supporting structure for the mirror whereby the latter may be adjusted from a plano surface to form parabolic reflecting surfaces, either concave or convex.

In this form of the invention, instead of being supported along its longitudinal edges, the mirror 100 is supported transversely at its opposite longitudinal extremities by a pair of curved frame members 101 similar in all respects to one another but each curving outwardly in the form of oppositely disposed symmetrical parabolas. The ends of each curved member 101 terminate in short longitudinal bearings 102 each rotatably connected by means of transverse pins 104 to one end of separate link 103 which are in turn rotatably connected at their opposite ends to bearing portions 105 and 106, respectively, on the ends of a pair of arms 107 and 108 secured to opposite sides of the square member 57. As shown in Fig. 16, each of the arms 107 and 108 extends outwardly in opposite directions from opposite sides of the square member 57 so that the bearing portions 105 and 106 on one end of the arms 107 and 108 are operatively connected to one of the curved members 101, while the bearing portions on the other end of the arms 107 and 108 are similarly connected to the oppositely disposed curved member 101.

Intermediate the bearings 102, each curved member 101 has a pair of lugs 109 spaced longitudinally from one another and supporting a short pin 110. On each side of the lugs 109, the curved members 101 are provided with longitudinal slots 111 for the reception of the rounded longitudinal extremities of the mirror 100, each of which extremities has a cut out portion 112 to accommodate the lugs 109.

Each of the pins 110 cooperates with one of a pair of arms 113 and 114 carried by the tubular member 44 and extending longitudinally from the opposite sides of the latter, said arms having a downwardly bent portion 115 and an inwardly bent portion 116, the free end of which is bifurcated to embrace one of the pins 110. The pins 110 together with the bifurcated inner ends of the arms 113 and 114 form fixed pivots P about which the curved members 101 are rotatable to maintain the longitudinal axis of the mirror 100 fixed with respect to the composing board.

As in the case of the supporting device of Figs. 1 to 7 inclusive, the square member 57 is movable longitudinally in the tubular member 44 by the gear mechanism previously described to raise and lower the opposite bearing ends 102 of the curved members 101. In Fig. 15, the mirror is shown in full lines as a plano reflecting surface when the curved members 101 lie in the same plane as the fixed pivots P. However, when the square member 57 is moved in an upward direction in the tubular member 44, the opposite bearing ends 102 of the curved members 101 are raised to rotate the latter on the fixed pivots P. Due to the parabolic curvature of the members 101, the mirror 100 will be flexed transversely on each side of the fixed pivots P to provide a convex parabolic reflecting surface 100a shown in dotted lines in Fig. 15. On the other hand, when the bearing ends 102 of the curved members 101 are lowered below the plane of the fixed pivots P by downward movement of the square member 57, the mirror will be flexed transversely on each side of the fixed pivots in the opposite direction to provide a concave parabolic reflecting surface 100b also shown in dotted lines in Fig. 15.

It is also to be noted that since the copy board is placed at a distance from the mirror center which corresponds to the vicinity of the principal focus of the mirror when at its highest degree of concave curvature, the image is not only focused for that degree of curvature but for all lesser degrees, while for all convex curvatures there is constant focus from the same location of the copy board.

Thus, rotation of the parabolically curved members 101 on their fixed pivots P in one direction or the other produces a progressive series of parabolic mirror curvatures and, in accordance with the familiar principles of optical correction, it will be seen that with this form of supporting structure for the mirror, any irregularities of image due to spherical aberration or distortion will be corrected at all the variable degrees of curvature which may be imparted to the mirror.

With this form of the invention, the tubular member 44 is also rotatable by the worm gear arrangement used in connection with the device heretofore described in connection with Figs. 1 to 7 to alter the character of the reflected image.

It will thus be seen that a great range of progressively altered and differently proportioned images may be reflected into the camera, and photographed by the usual means, and thus a great number of variously lengthened, shortened, slanted, back-slanted and otherwise altered prints may be made from one original setting of a complete type line on the copy board.

From the foregoing it is believed that the construction and advantages of my invention may be readily understood by those skilled in the art without further description, it being borne in mind that numerous changes may be made in the details disclosed without departing from the spirit of the invention as set out in the following claims.

What I claim is:

1. In photographic reproducing apparatus of the class described including a copy board for the subject matter to be reproduced, and a camera; the improvement which consists in a device for reflecting selectively different images of the same subject matter from the copy board to the camera, comprising a flexible mirror, a pair of oppositely disposed curved members supporting said mirror at its opposite longitudinal extremities, means supporting said curved members intermediate their ends and forming therewith a pair of pivots corresponding to the center line of the mirror, said means maintaining said mirror center line at a predetermined distance from the copy board with the subject in the vicinity of the principal focus of the mirror for a predetermined maximum degree of concave mirror curvature, and means for moving the opposite ends of said curved members with respect to the mirror center line to selectively provide concave and convex reflecting surfaces, of progressively different degrees of curvature, said first named means maintaining the different images in focus for the different reflecting surfaces and the different degrees of concave and convex mirror curvatures.

2. In photographic reproducing apparatus of the class described including a copy board for the subject matter to be reproduced, and a camera; the improvement which consists in a device for reflecting selectively different images of the same subject matter from the copy board to the camera, comprising a flexible mirror, a pair of oppositely disposed parabolically curved members supporting said mirror at its opposite longitudinal extremities, means supporting said parabolically curved members intermediate their ends and forming therewith a pair of pivots corresponding to the center line of the mirror, said means maintaining said mirror center line at a predetermined distance from the copy board with the subject in the vicinity of the principal focus of the mirror for a predetermined maximum degree of concave mirror curvature, and means for moving the opposite ends of said parabolically curved members with respect to the mirror center line to selectively provide concave and convex reflecting surfaces, of progressively different degrees of curvature, said first named means maintaining the different images in focus for the different reflecting surfaces and the different degrees of concave and convex mirror curvatures.

3. In photographic reproducing apparatus of the class described including a copy board for the subject matter to be reproduced, and a camera; the improvement which consists in a device for reflecting respectively different images of the same subject matter from the copy board to the camera, comprising a flexible mirror, a standard, means rotatably mounted on said standard, a pair of arms carried by said rotatable means, said arms terminating at their free ends on opposite sides of said mirror corresponding to the mirror center line and disposed in the plane of the mirror, a pair of curved members slotted longitudinally to receive the opposite longitudinal extremities of said mirror, said curved members being pivotally supported intermediate their longitudinal extremities on the free ends of said arms, and means for moving said longitudinal extremities of the curved members with respect to the mirror center line to bend the said mirror on each side of its center line, below and above the plane of the mirror, movement of said longitudinal extremities of the curved members in one direction providing concave reflecting surfaces of progressively different degrees of curvature, and movement of said longitudinal extremities of the curved members in the opposite direction providing convex reflecting surfaces of progressively different degrees of curvature, the pivotal supports for said curved members maintaining the said mirror with its center line at a predetermined distance from the copy board for the different reflecting surfaces and the different degrees of concave and convex mirror curvatures.

4. In photographic reproducing apparatus of the class described including a copy board having thereon the subject to be reproduced, and a camera for photographing an image of the subject; the improvement which consists in a device for reflecting selectively different images of the same subject from the copy board to the camera, comprising a frame, a flexible mirror arranged within said frame, a pair of shafts extending longitudinally within said frame on opposite sides of said mirror, separate means rotatably mounted on said shafts and engaging adjacent longitudinal edges of said mirror to support the latter in said frame, a standard, a hollow member rotatably supported on said standard and extending downwardly therefrom to a point above said mirror, means on the lower end of said hollow member extending longitudinally across said mirror corresponding to the center line of the latter, said last named means terminating in pivot pins adjacent the opposite longitudinal extremities of said mirror and in the plane of the latter, separate link members on each side of said center line pivotally connected at one end to said pivot pins and secured to said separate means adjacent the longitudinal extremities of said mirror, and a second member longitudinally movable in said hollow member to move said frame selectively with respect to the plane of the mirror, whereby said mirror is bent on each side of the center line to provide concave and convex reflecting surfaces of different degrees of cylindrical curvature, said link means cooperating with said separate means and said pivot pins to maintain the mirror center line at a predetermined distance from the copy board for the different reflecting surfaces and the different degrees of cylindrical mirror curvature, whereby the different rectilinear images of the same subject on the copy board are maintained in focus for the different reflecting surfaces and the different degrees of mirror curvature.

5. In photographic reproducing apparatus of the class described including a copy board for the subject matter to be reproduced, and a camera for reproducing an image of the subject; a mirror construction for reflecting selectively different images from the same subject to the camera comprising a standard, a hollow cylindrical member rotatably mounted on said standard and extending downwardly therefrom, a second member extending downwardly from said standard and supported in said hollow member, said second member being longitudinally movable in said hollow member toward and away from the copy board, a frame supported on the lower end of said second member, a flexible mirror disposed within said frame, means rotatably supporting the opposite longitudinal edges of said mirror in said frame, a bar member carried on the lower end of the said cylindrical member and terminating at its opposite extremities in a pair of pivots adjacent opposite longitudinal extremities of the mirror, said pivots being in alignment and corresponding to the longitudinal center line of said mirror, and link members fixed at one end to said rotatable means, said link members being pivotally connected at their opposite ends to said pivots, whereby movement of said second member toward and away from the copy board causes said link members to rotate said rotatable supporting means to impart progressively different degrees of concave and convex curvatures to the mirror, said link members cooperating with said pivots to maintain said mirror center line at a predetermined distance from the copy board for the different degrees of curvature of the mirror, whereby the subject remains in focus for the different reflecting surfaces and the different degrees of concave and convex mirror curvatures.

6. In apparatus of the class described, in combination, a composing board for the subject matter to be reproduced, a camera for reproducing the subject matter, a flexible substantially rectangular mirror arranged to reflect selectively different rectilinear images from the same subject on the composing board to the camera along a secondary axis, a pair of longitudinally extending members in parallel spaced relation to each other and engaging the longitudinal edges of said mirror, a pair of fixed pivot members adjacent opposite longitudinal extremities of said mirror and in the plane thereof, said pivot members being in axial alinement and corresponding to the longitudinal center line of the mirror parallel to the longitudinal edges of the latter, transverse link members operatively connecting said pair of longitudinally extending members and said fixed pivot members and forming crank levers, and means for moving said pair of longitudinally extending members selectively in opposite directions relative to the plane of said mirror to impart different degrees of concave and convex cylindrical curvature to said mirror, said crank levers cooperating with said fixed pivot members to maintain the longitudinal center line of said mirror fixed, whereby the reflected rectilinear image is maintained within a predetermined depth of focus for the different reflecting surfaces of the mirror and the different degrees of concave and convex cylindrical curvature.

7. In apparatus of the class described, in combination, a composing board for the subject matter to be reproduced, a camera for reproducing the subject matter, a flexible substantially rectangular mirror arranged to reflect selectively different rectilinear images from the same subject on the composing board to the camera along a secondary axis, a pair of longitudinally extending members in parallel spaced relation to each other and engaging the longitudinal edges of said mirror, a pair of fixed pivot members adjacent opposite longitudinal extremities of said mirror and in the plane thereof, said fixed pivot members being in axial alinement and corresponding to the longitudinal center line of the mirror parallel to the longitudinal edges of the latter, transverse link members operatively connecting said pair of longitudinally extending members and said fixed pivot members and forming crank levers, and means for rotating said mirror about a central axis to thereby tilt the longitudinal center line of the mirror relative to the center line of the subject matter on the composing board.

8. In apparatus of the class described, in combination, a removable composing board having overlapping sheets arranged to provide a series of pockets adapted to receive individual type strips, a substantially rectangular frame, a flexible substantially rectangular mirror within the confines of said frame arranged to reflect selectively different rectilinear images from the same subject on the composing board along a secondary axis, a pair of longitudinally extending support members pivotally mounted in said frame and engaging the longitudinal parallel edges of said mirror on opposite sides of the longitudinal center line of the latter, means for moving said frame transversely to the plane of said mirror, and means for rocking said support members in opposite directions with respect to one another synchronously with the movement of said frame to move the opposite longitudinal edges of said mirror relative to the longitudinal center line thereof to thereby impart a true cylindrical curvature to the mirror by maintaining the longitudinal center line thereof fixed and the longitudinal edges in parallel relation with respect to one another and to the mirror center line, whereby the rectilinear image from the composing board remains in a predetermined focal relation to the mirror for the different reflecting surfaces.

9. In photographic reproducing apparatus of the class described including a copy board having thereon the subject to be reproduced, and a camera for photographing an image of the subject; the improvement which consists in a device for reflecting selectively different images of the same subject from the copy board to the camera, comprising a frame, a flexible mirror arranged within said frame, a pair of shafts extending longitudinally within said frame on opposite sides of said mirror, separate means rotatably mounted on said shafts and engaging adjacent longitudinal edges of said mirror to support the latter in said frame, a standard, a hollow member rotatably supported on said standard and extending downwardly therefrom to a point above said mirror, means on the lower end of said hollow member extending longitudinally across said mirror corresponding to the center line of the latter, said last named means terminating in pivot pins adjacent the opposite longitudinal extremities of said mirror and in the plane of the latter, separate link members on each side of said center line pivotally connected at one end to said pivot pins and secured to said separate means adjacent the longitudinal extremities of said mirror, and a second member longitudinally movable in said hollow member to move said frame selectively with respect to the plane of the mirror, whereby said mirror is bent on each side of the center line to provide concave and convex reflecting surfaces of different degrees of cylindrical curvature, said link means cooperating with said separate means and said pivot pins to maintain the mirror center line at a predetermined distance from the copy board for the different reflecting surfaces and the different degrees of cylindrical mirror curvature, whereby the different rectilinear images of the same subject on the copy board are maintained in focus for the different reflecting surfaces and the different degrees of mirror curvature, and means for rotating said hollow member to thereby tilt the mirror center line relative to the center line of the subject of the copy board.

10. In photographic reproducing apparatus of the class described including a copy board for the subject matter to be reproduced, and a camera for reproducing an image of the subject; a mirror construction for reflecting selectively different images from the same subject to the camera comprising a standard, a hollow cylindrical member rotatably mounted on said standard and extending downwardly therefrom, a second member extending downwardly from said standard and supported in said hollow member, said second member being longitudinally movable in said hollow member toward and away from the copy board, a frame supported on the lower end of said second member, a flexible mirror disposed within said frame, means rotatably supporting the opposite longitudinal edges of said mirror in said frame, a bar member carried on the lower end of the said cylindrical member and terminating at its opposite extremities in a pair of pivots adjacent opposite longitudinal extremities of the mirror, said pivots being in alignment and corresponding to the longitudinal center line of said mirror, and link members fixed at one end to said rotatable means, said link members being pivotally connected at their opposite ends to said pivots, whereby movement of said second member toward and away from the copy board causes said link members to rotate said rotatable supporting means to impart progressively different degrees of concave and convex curvatures to the mirror, said link members cooperating with said pivots to maintain said mirror center line at a predetermined distance from the copy board for the different degrees of curvature of the mirror, whereby the subject remains in focus for the different reflecting surfaces and the different degrees of concave and convex mirror curvatures, and means for rotating said hollow cylindrical member to thereby tilt the mirror center line relative to the center line of the subject of the copy board.

11. Apparatus of the class described comprising, in combination, a substantially flat base member, a composing board removably mounted on said base member adjacent one end thereof and having overlapping sheets on its upper face arranged to provide a series of pockets adapted to receive individual type strips, a pair of track members mounted on said base member and extending longitudinally from one end thereof toward said composing board, a camera movable along said track members toward and away from said composing board, a standard extending upwardly from said base member adjacent said composing board, a substantially rectangular frame mounted on said standard and arranged to overlie said composing board, said frame being disposed at an angle of approximately 45° with respect to said composing board, a substantially rectangular flexible mirror within the confines of said frame for reflecting selectively different images from the same subject of the composing board to the camera, a pair of longitudinally extending support members pivotally mounted in said frame and engaging the parallel longitudinal edges of said mirror, means for moving said frame toward and away from said composing board, and means for rocking said support members in opposite directions with respect to one another synchronously with the movement of said frame to move the opposite longitudinal edges of said mirror and impart a true cylindrical curvature to said mirror while maintaining the longitudinal center line thereof fixed, whereby the reflected image is maintained within a predetermined depth of focus for different degrees of cylindrical curvature, said support members maintaining the longitudinal edges of said mirror in parallel relation with respect to one another and with respect to the mirror center line whereby said mirror reflects true parallelogram images from the parallelogram subject on the composing board for different degrees of curvature of the mirror.

12. Apparatus of the class described comprising, in combination, a substantially flat base member, a composing board removably mounted on said base member adjacent one end thereof and having overlapping sheets on its upper face arranged to provide a series of pockets adapted to receive individual type strips, a pair of track members mounted on said base member and extending longitudinally from one end thereof toward said composing board, a camera movable along said track members toward and away from said composing board, a standard extending upwardly from said base member adjacent said composing board, a substantially rectangular frame mounted on said standard and arranged to overlie said composing board, said frame being disposed at an angle of approximately 45° with respect to said composing board, a substantially rectangular flexible mirror within the confines of said frame for reflecting selectively different images from the same subject of the composing board to the camera, a pair of longitudinally extending support members pivotally mounted in said frame and engaging the parallel longitudinal edges of said mirror, means for moving same frame toward and away from said composing board, and means for rocking said support members in opposite directions with respect to one another synchronously with the movement of said frame to move the opposite longitudinal edges of said mirror and impart a true cylindrical curvature to said mirror while maintaining the longitudinal center line thereof fixed, whereby the reflected image is maintained within a predetermined depth of focus for different degrees of cylindrical curvature, said support members maintaining the longitudinal edges of said mirror in parallel relation with respect to one another and with respect to the mirror center line whereby said mirror reflects true parallelogram images from the parallelogram subject on the composing board for different degrees of curvature of the mirror, and means for rotating said frame about a central axis to thereby tilt the longitudinal center line of the mirror relative to the center line of the subject on the composing board.

13. In apparatus of the class described, in combination, a flexible substantially rectangular mirror, a pair of longitudinally extending members engaging and supporting opposite longitudinal edges, respectively, of said mirror, means forming fixed pivot members adjacent the opposite longitudinal extremities of said mirror between said pair of mirror supporting members, a pair of oppositely disposed transverse link members adjacent each longitudinal extremity of said mirror, each link member being pivotally connected at one end to a pivot member and being rigidly connected at its other end to a mirror supporting member, and means for moving said mirror supporting members transversely to the plane of said mirror whereby to effect rocking movement of said supporting members by said link members about said fixed pivot members and flex the mirror on opposite sides of its center line while maintaining said center line substantially fixed.

14. In apparatus of the class described, in combination, a composing board for the subject matter to be reproduced, a flexible substantially rectangular mirror arranged to reflect selectively different images from the same subject on the composing board along a secondary axis, a pair of longitudinally extending members engaging and supporting opposite longitudinal edges, respectively, of said mirror, means forming fixed pivots adjacent the longitudinal extremities of said mirror between said pair of mirror supporting members, a pair of oppositely disposed transverse link members adjacent each longitudinal extremity of the mirror, each link member being pivotally connected at one end to a fixed pivot on said pivot-forming means and being rigidly connected at its other end to a mirror supporting member, and means for moving said pair of mirror supporting members relatively to the composing board to effect rocking movement of said mirror supporting members by said link members about the pivots on said pivot-forming means and flex the mirror on opposite sides of its longitudinal center line of the mirror is maintained substantially fixed relative to the subject on the composing board.

15. Apparatus of the class described comprising a substantially flat base member, a composing board removably mounted on said base member for the subject matter to be reproduced, a flexible substantially rectangular mirror arranged to reflect an image of the subject matter on said composing board along a secondary axis, a camera slidably mounted on said base member and arranged to reproduce images reflected from said mirror, a pair of longitudinally extending members engaging and supporting opposite longitudinal edges, respectively, of said mirror, means forming fixed pivots adjacent the longitudinal extremities of said mirror between said pair of mirror supporting members, a pair of oppositely disposed transverse link members adjacent each longitudinal extremity of said mirror, each link member being pivotally connected at one end to a fixed pivot on said pivot-forming means and being rigidly secured at its other end to a mirror supporting member, and means for moving said pair of mirror supporting members relatively to said composing board to effect rocking movement of said mirror supporting members by said link members about the pivots on said pivot-forming means and flex the mirror on opposite sides of its longitudinal center line to impart different degrees of cylindrical curvature to said mirror for the reflection of respectively different images from the same subject on said composing board while maintaining each image within a predetermined depth of focus for the different degrees of curvature of the mirror.

LOUIS GRUDIN.